(12) United States Patent
Garg et al.

(10) Patent No.: US 10,664,717 B2
(45) Date of Patent: May 26, 2020

(54) SYSTEM AND METHOD FOR SEARCHING AN IMAGE WITHIN ANOTHER IMAGE

(71) Applicant: Interra Systems, Inc., Cupertino, CA (US)

(72) Inventors: Paras Garg, New Delhi (IN); Rishi Gupta, Noida (IN); Shekhar Madnani, Noida (IN); Bhupender Kumar, Palwal (IN)

(73) Assignee: Interra Systems, Inc., Cupertino, CA (US)

( * ) Notice: Subject to any disclaimer, the term of this patent is extended or adjusted under 35 U.S.C. 154(b) by 144 days.

(21) Appl. No.: 16/011,609

(22) Filed: Jun. 18, 2018

(65) Prior Publication Data

US 2019/0384999 A1    Dec. 19, 2019

(51) Int. Cl.
*G06K 9/32* (2006.01)
*G06T 7/13* (2017.01)
*G06T 5/00* (2006.01)
*G06T 7/12* (2017.01)

(52) U.S. Cl.
CPC ............ *G06K 9/3258* (2013.01); *G06T 5/002* (2013.01); *G06T 7/12* (2017.01); *G06T 7/13* (2017.01); *G06T 2207/10024* (2013.01); *G06T 2207/20182* (2013.01)

(58) Field of Classification Search
CPC ........ G06K 9/00; G06K 9/3258; G06K 9/627; G06K 9/6212; G06K 9/6204; G06K 2209/25; G06T 5/002; G06T 7/12; G06T 7/13; G06T 2207/10024; G06T 2207/20182

USPC .......................................................... 382/173
See application file for complete search history.

(56) References Cited

U.S. PATENT DOCUMENTS

| | | | | |
|---|---|---|---|---|
| 6,445,832 B1* | 9/2002 | Lee | ......................... | G06K 9/32 382/266 |
| 7,167,583 B1* | 1/2007 | Lipson | ..................... | G06K 9/00 361/720 |
| 2009/0074299 A1* | 3/2009 | Wenzel | ................ | G06K 9/3275 382/203 |
| 2009/0173791 A1* | 7/2009 | Pine | ......................... | G06K 9/00 235/454 |
| 2010/0034476 A1* | 2/2010 | Kido | .................... | G06K 9/6203 382/243 |

(Continued)

*Primary Examiner* — Ali Bayat
(74) *Attorney, Agent, or Firm* — Next IP Law Group LLC (57) ABSTRACT

A system and a method for searching an image within another image are disclosed. The method includes producing template edge images and target edge images, having image scales, based on determination of edge gradients of a template image and a target image in one or more directions. The template image indicates an image to be searched. The target image indicates another image within which the image needs to be searched. Further, images comprising correlation coefficient values are produced for each of the directions by computing correlation coefficients between the template edge images and the target edge images. At least one local peak is identified from each of the images comprising the correlation coefficient values. Spatial locations along with the correlation coefficients corresponding to the local peak are determined. Thereafter, a presence of the template image in the target image is identified based upon an intersection of the spatial locations.

13 Claims, 5 Drawing Sheets

(56) References Cited

U.S. PATENT DOCUMENTS

2010/0098339 A1* 4/2010 Kido .................... G06K 9/6253
382/199

* cited by examiner

SYSTEM AND METHOD FOR SEARCHING AN IMAGE WITHIN ANOTHER IMAGE

FIELD OF THE DISCLOSURE

The present disclosure is generally related to image searching, and more particularly related to a method for searching an image within another image.

BACKGROUND

The subject matter disclosed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Template matching is a technique to recognize content in an image. The template matching techniques include a feature point based template matching that extracts features from an input image and a model image. The features are matched between the model image and the input image with K-nearest neighbor search. Thereafter, a homography transformation is estimated from the matched features, which may be further refined. However, the feature point based template matching technique works well only when images contain a sufficient number of interesting feature points. Further, the feature point based template matching fails to produce a valid homography, and thus result in ambiguous matches.

Further, the template matching techniques include a technique to search an input image by sliding a window of a model image in a pixel-by-pixel manner, and then computing a degree of similarity between the input image and the model image, where the similarity is given by correlation or normalized cross correlation. However, pixel-by-pixel template matching is very time-consuming and computationally expensive. Further, the searching for the input image with arbitrary orientation in the model image makes the template matching technique far more computationally expensive.

Therefore, there may be a need for an improved system and a method for template matching in an image or a video that may be cost effective, robust, efficient, and may reduce computation time.

SUMMARY

In one aspect of the present disclosure, a method for searching an image within another image is provided. The method includes producing a plurality of template edge images, having one or more image scales, based on determination of edge gradients of a template image in one or more directions. The template image indicates an image to be searched. The method further includes producing a plurality of target edge images, having one or more image scales, based on determination of edge gradients of a target image in the one or more directions. The target image indicates another image within which the image needs to be searched. Further, the method includes producing images comprising correlation coefficient values for each of the one or more directions by computing correlation coefficients between the plurality of template edge images and the plurality of target edge images. The method further includes identifying at least one local peak from each of the images comprising the correlation coefficient values. Further, the method includes determining spatial locations along with the correlation coefficients corresponding to the at least one local peak. Thereafter, the method includes identifying presence of the template image in the target image based upon an intersection of the spatial locations.

In another aspect of the present disclosure, a system for searching an image within another image is provided. The system includes a processor and a memory. The processor is configured to produce a plurality of template edge images, having one or more image scales, based on determination of edge gradients of a template image in one or more directions. The template image indicates an image to be searched. The processor is further configured to produce a plurality of target edge images, having one or more image scales, based on determination of edge gradients of a target image in the one or more directions. The target image indicates another image within which the image needs to be searched. Further, the processor is configured to produce images comprising correlation coefficient values for each of the one or more directions by computing correlation coefficients between the plurality of template edge images and the plurality of target edge images. Further, the processor is configured to identify at least one local peak from each of the images comprising the correlation coefficient values. Further, the processor is configured to determine spatial locations along with the correlation coefficients corresponding to the at least one local peak. Thereafter, the processor is configured to identify presence of the template image in the target image based upon an intersection of the spatial locations.

In one aspect of the present disclosure, a non-transient computer-readable medium comprising instruction for causing a programmable processor to search an image within another image by producing a plurality of template edge images, having one or more image scales, based on determination of edge gradients of a template image in one or more directions. The template image indicates an image to be searched. A plurality of target edge images, having one or more image scales, are produced based on determination of edge gradients of a target image in the one or more directions. The target image indicates another image within which the image needs to be searched. Further, images comprising correlation coefficient values are produced for each of the one or more directions by computing correlation coefficients between the plurality of template edge images and the plurality of target edge images. At least one local peak is identified from each of the images comprising the correlation coefficient values. Further, spatial locations along with the correlation coefficients corresponding to the at least one local peak are determined. Thereafter, a presence of the template image in the target image is identified based upon an intersection of the spatial locations.

Other features and aspects of this disclosure will be apparent from the following description and the accompanying drawings.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is an object of the current disclosure to provide a system and a method for searching an image within another image.

Figure 1:
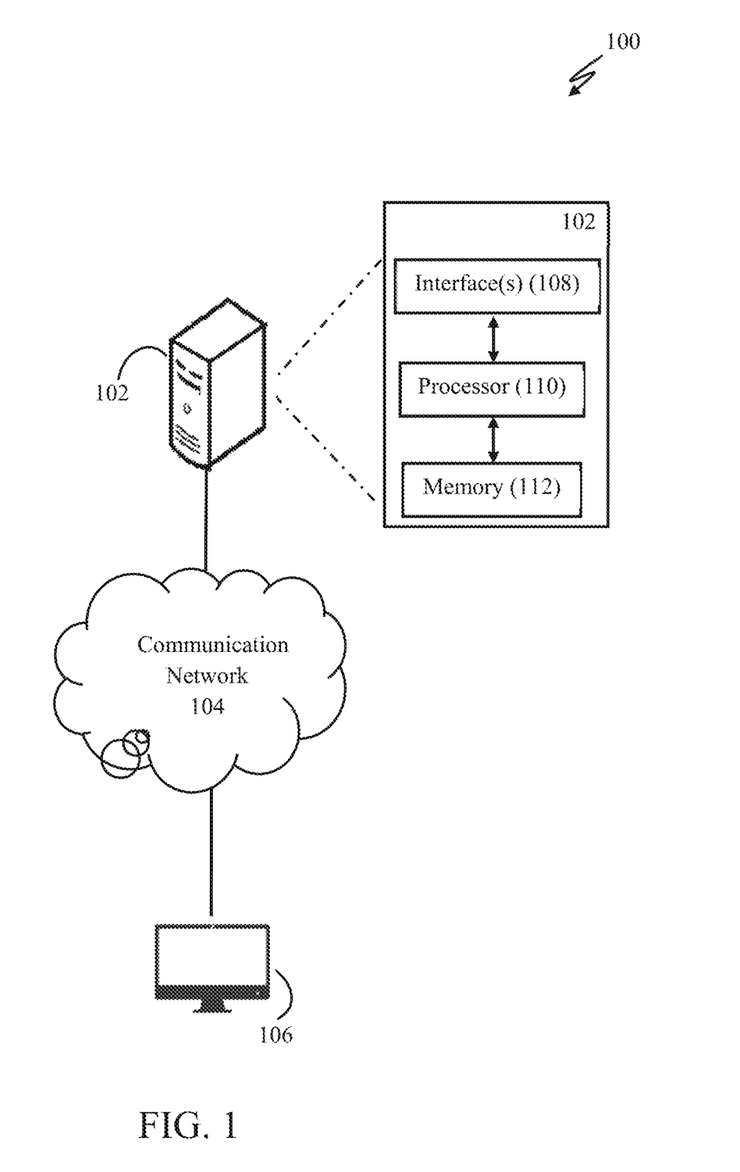
FIG. 1 illustrates a network connection diagram 100 of a system 102 for searching an image within another image, according to embodiments of the present disclosure.

FIG. 1 illustrates a network connection diagram 100 of a system 102 for searching an image within another image, in accordance with an embodiment of present disclosure. The network connection diagram 100 further illustrates a communication network 104 connected to the system 102 and a computing device 106.

The communication network 104 may be implemented using at least one communication technique selected from Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Radio waves, and any other wired and/or wireless communication technique known in the art.

The computing device 106 may be used by a user to provide a template image and a target image to the system 102. The template image may indicate an image to be searched. The target image that may indicate another image within which the image needs to be searched. The template image and the target image may be present at one or more image scales. In an embodiment, the computing device 106 may include suitable hardware that may be capable of reading the one or more storage mediums (e.g., CD, DVD, or Hard Disk). Such storage mediums may include the template image and the target image. The computing device 106 may be realized through a variety of computing devices, such as a desktop, a computer server, a laptop, a personal digital assistant (PDA), or a tablet computer.

The system 102 may further comprise interface(s) 108, a processor 110, and a memory 112. The interface(s) 108 may be used to interact with or program the system 102 to search an image within another image. The interface(s) 108 may either be a Command Line Interface (CLI) or a Graphical User Interface (GUI).

The processor 110 may execute computer program instructions stored in the memory 112. The processor 110 may also be configured to decode and execute any instructions received from one or more other electronic devices or one or more remote servers. In an embodiment, the processor 110 may also be configured to process an image received from the computing device 106. The processor 110 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The memory 112 may include a computer readable medium. A computer readable medium may include volatile and/or non-volatile storage components, such as optical, magnetic, organic or other memory or disc storage, which may be integrated in whole or in part with a processor, such as the processor 110. Alternatively, the entire computer readable medium may be present remotely from the processor 110 and coupled to the processor 110 by connection mechanism and/or network cable. In addition to the memory 112, there may be additional memories that may be coupled with the processor 110.

Figure 2:
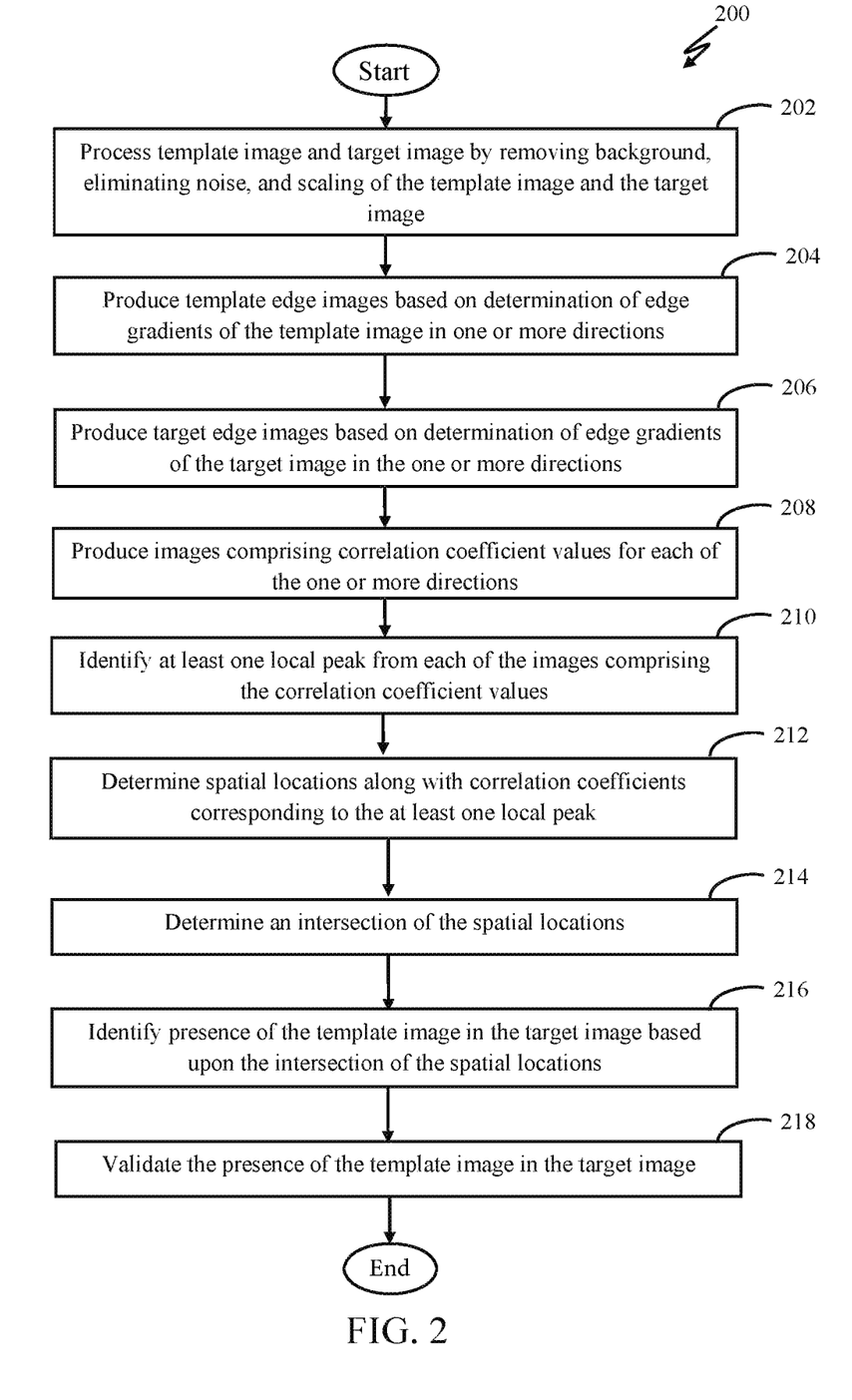
FIG. 2 illustrates a flowchart 200 showing a method for identifying presence of a template image in a target image, according to embodiments of the present disclosure.

The method for searching an image within another image may now be explained with reference to FIG. 1 and FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
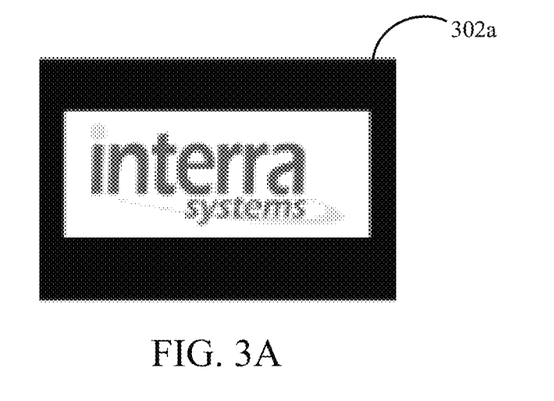
FIG. 3A illustrates an example of a template image 302a that is to be searched, according to embodiments of the present disclosure.
Figure 3B:
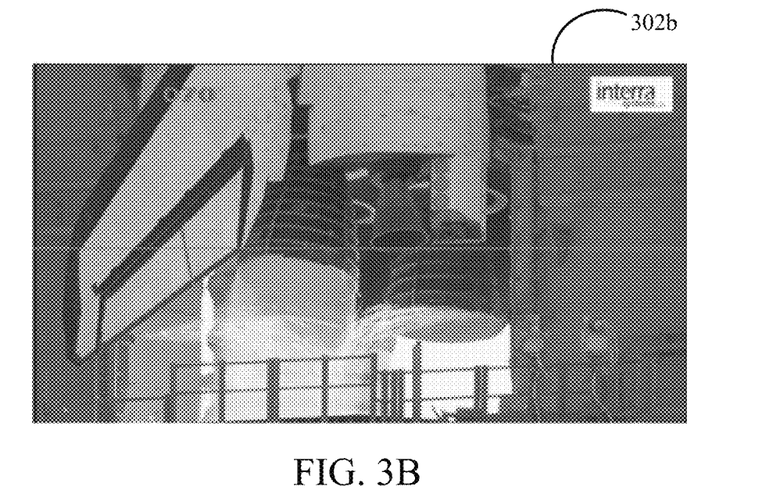
FIG. 3B illustrates an example of a target image 302b within which the template image 302a needs to be searched, according to embodiments of the present disclosure.

At first, the system 102 may receive a template image and a target image from a user via the computing device 106. In another embodiment, the system 102 may retrieve the template image from a video stream. The template image may indicate an image to be searched. In one case, the template image may be transparent. In another case, the template image may be a logo or a text. For example, a template image 302a is illustrated in FIG. 3A. On the other hand, the target image may indicate another image within which the image needs to be searched. In one case, the target image may be a video sequence. For example, a target image 302b is illustrated in FIG. 3B.

Figure 3C:
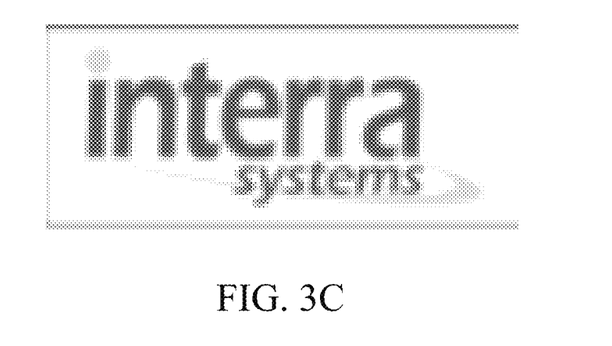
FIG. 3C illustrates an example of a template image having backgrounds removed from the template image 302a illustrated in FIG. 3A, according to embodiments of the present disclosure.

Successively, the template image and the target image may be processed, at step 202. The processing may include removing backgrounds from the template image. In a case, colored backgrounds may be removed from the template image. For example, as shown in FIG. 3C, background is removed from the template image 302a illustrated in FIG. 3A. Further, the processing may include eliminating noise from the template image and the target image, using low pass filters. The processing may further include scaling the template image and the target image at different scales to create scaled template images and scaled target images of multiple resolutions. Scaling of the images could refer to upscaling or downscaling of the image, and could be performed using any sampling algorithm, such as nearest-neighbour interpolation, Edge-directed interpolation, bilinear and bicubic sampling, Sinc and Lanczos sampling, box sampling, Mipmap sampling, Fourier transformation, vectorization, and deep convolutional neural networks. It should be noted that an aspect ratio may remain same during the scaling of the template image and the target image.

Successively, a plurality of template edge images may be produced, at step 204. The plurality of template images, having one or more image scales, may be produced based on determination of edge gradients of the template image in one or more directions. The edge gradients of the template image may be determined using gradient operators applied in the one or more directions.

A gradient operator (g) applied on the template image i.e. a two dimensional function f(x, y), could be represented using below mentioned equation.

$$g = \nabla f(x, y) = \begin{bmatrix} \frac{\partial}{\partial x} \\ \frac{\partial}{\partial y} \end{bmatrix} f(x, y) = \begin{bmatrix} f_x \\ f_y \end{bmatrix}$$

Figure 3D:
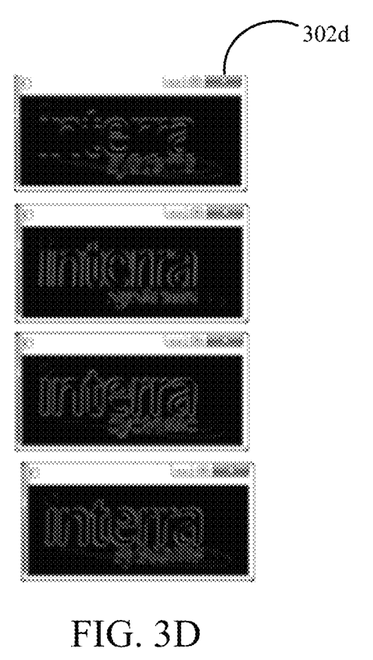
FIG. 3D illustrates an example of a plurality of template edge images 302d produced in one or more directions, according to embodiments of the present disclosure.
Figure 3E:
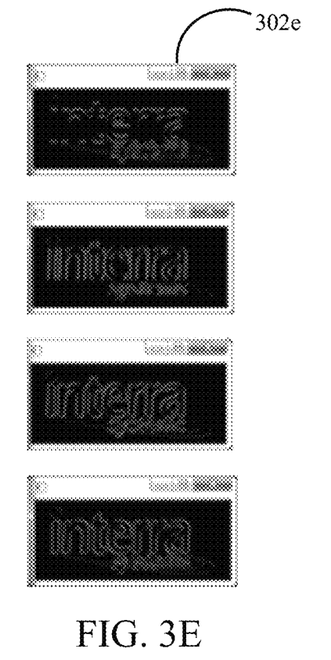
FIG. 3E illustrates an example of template edge images 302e produced for template images present at different scales, according to embodiments of the present disclosure.

Similarly, edge gradients of the template image could be determined in the one or more directions. It should be noted that absolute values of the determined edge gradients for each of the template images may be stored as 2D images in the memory 112. For example, as shown in FIG. 3D, template edge images 302d are produced in directions such as 0, 45, 90, or 135 degrees. The template edge images may be represented as $TemEdge_0$, $TemEdge_{45}$, $TemEdge_{90}$, and $TemEdge_{135}$. Further, FIG. 3E shows, template edge images 302e produced for the scaled template images that are present at different scales.

Successively, a plurality of target edge images may be produced, at step 206. The plurality of target edge images, having one or more image scales, may be produced based on determination of edge gradients of the target image in the one or more directions. The edge gradients of the target image may be determined using gradient operators applied in the one or more directions. It should be noted that absolute values of the determined edge gradients for each of the target images may be stored as 2D images in the memory 112. For example, target edge images are produced in the directions such as 0, 45, 90, or 135 degrees. The target edge images may be represented as $TgtEdge_0$, $TgtEdge_{45}$, $TgtEdge_{90}$, and $TgtEdge_{135}$. In an embodiment, the target edge may be scaled to create scaled target edge images in the one or more directions.

Figure 3F:
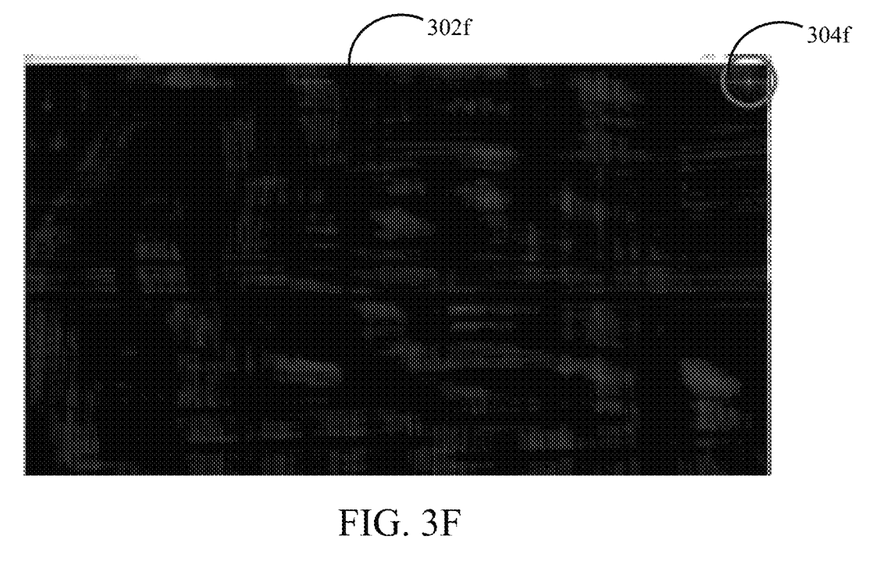
FIG. 3F illustrates an example of determining at least one local peak 304f from an image 302f comprising correlation coefficient values, according to embodiments of the present disclosure.

Successively, images comprising correlation coefficient values for each of the one or more directions may be produced, at step 208. The images comprising the correlation coefficient values may be produced by computing correlation coefficients between the plurality of template edge images and the plurality of target edge images. In one case, the correlation may be indicative of a Normalized-Cross-Correlation (NCC). For example, as shown in FIG. 3F, an image 302f containing correlation coefficient values is produced by computing correlation coefficients between the template edge images and the target edge images in the one or more directions such as 0, 45, 90, or 135 degrees. Successively, at least one local peak may be identified from each of the images comprising the correlation coefficient values, at step 210.

In one embodiment, a point (x, y) may be defined as a local peak for a 2D function f: $R^2 \rightarrow R$ if $f(x,y) > f(u, v) \forall (u, v) \in \{(a,b) | (a-x)^2 + (b-y)^2 < R^2\} - \{(x,y)\}$. In above mentioned 2D function, R may correspond to radius of a circle centered at (x,y). The circle centered around (x,y) can be considered as the area under consideration. Utilizing above described relation, at least one local peak 304f may be identified from the image 302f comprising the correlation coefficient values, as illustrated in FIG. 3F. Thereafter, spatial locations along with the correlation coefficients corresponding to the at least one local peak may be determined, at step 212. In an example, the spatial locations along with the correlation coefficients corresponding to top five peaks having highest values may be determined for each of the directions such as 0, 45, 90, and 135 degrees. The spatial locations may be represented as $S_0 = \{(x1_0, y1_0), (x2_0, y2_0), \ldots, (x5_0, y5_0)\}$, $S_{45} = \{(x1_{45}, y1_{45}), (x2_{45}, y2_{45}), \ldots, (x5_{45}, y5_{45})\}$, and so on. In one case, the spatial locations could be ranked based on values of corresponding correlation coefficients. It should be noted that the correlation coefficient values may range from −1 to 1. In an embodiment, the spatial locations along with the values of the correlation coefficients may be stored in the memory 112.

Successively, an intersection of the spatial locations may be determined, at step 214. In one case, the intersection of the spatial locations at different scales may be determined for each of the one or more directions. For example, when the directions are 0, 45, 90, and 135 degrees, then the intersection, $S_{Match}(scale_n)$ is given as $S_0 \cap S_{45} \cap S_{90} \cap S_{135}$. Thereafter, based upon the intersection of the spatial locations, a presence of the template image in the target image may be identified, at step 216. For example, in a case, if $S_{Match}(scale_n)$ is found to be empty, then the template image is not present in the target image for $scale_n$. Otherwise, the template image is present in the target image i.e., the template image is expected to match at one or more spatial locations as specified within the $S_{Match}(scale_n)$.

Successively, the presence of the template image in the target image may be validated, at step 218. In one case, the validation may be performed based on statistical inference of the correlation coefficients exceeding a predefined threshold. The statistical inference may correspond to at least one of a maximum, mean, and a median of the correlation coefficients. In another embodiment, the validation may be performed based on color match between the template image and the target image at the spatial locations. It will be apparent to one skilled in the art that the above-mentioned validation techniques have been provided only for illustration purposes. In an embodiment, the validation of the presence of the template image in the target image may be performed by some other technique as well, without departing from the scope of the disclosure.

It should be noted that above-mentioned directions have been provided only for illustration purposes. In an embodiment, the one or more directions such as 30, 60, or 180 degrees, may be used as well, without departing from the scope of the disclosure.

Figure 4:
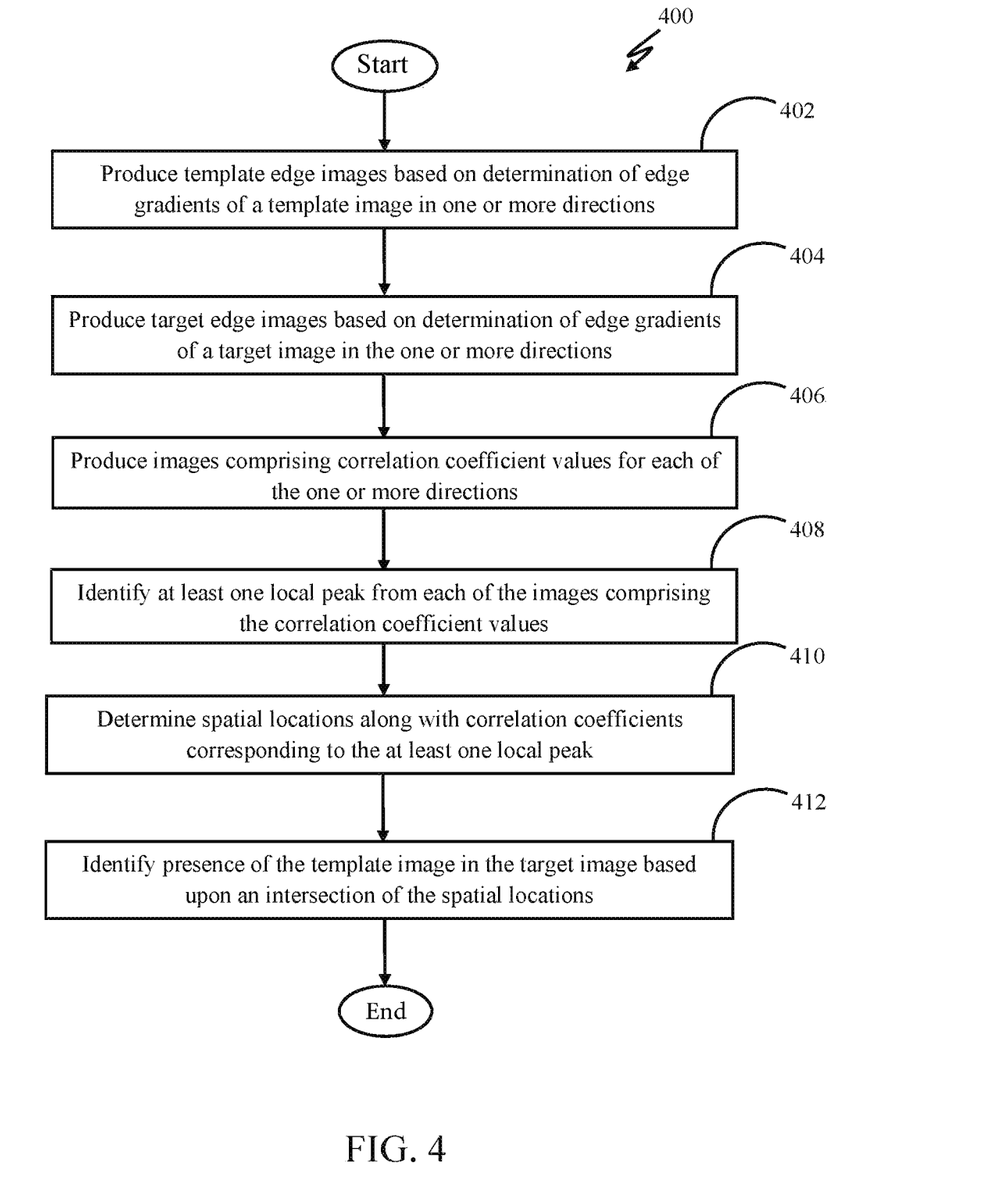
FIG. 4 illustrates a flowchart 400 showing a method for searching an image within another image, according to embodiments of the present disclosure.

FIG. 4 illustrates a flowchart 400 of a method for searching an image within another image, according to an embodiment. The flow chart of FIG. 4 shows the method steps executed according to one or more embodiments of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 400 starts at the step 402 and proceeds to step 412.

At step 402, a plurality of template edge images may be produced based on determination of edge gradients of a template image in one or more directions. The template edge images may be present at one or more image scales. The template image may indicate an image to be searched. In one embodiment, the plurality of template images may be produced by the processor 110.

At step 404, a plurality of target edge images may be produced based on determination of edge gradients of a target image in the one or more directions. The target edge images having one or more image scales. The target image may indicate another image within which the image needs to be searched. In one embodiment, the plurality of target edge images may be produced by the processor 110.

At step 406, images comprising correlation coefficient values for each of the one or more directions may be produced. The images comprising the correlation coefficient values may be produced by computing correlation coefficients between the plurality of template edge images and the plurality of target edge images. In one embodiment, the images comprising the correlation coefficient values may be produced by the processor 110.

At step 408, at least one local peak may be identified from each of the images comprising the correlation coefficient values. In one embodiment, the at least one local peak may be identified by the processor 110.

At step 410, spatial locations along with the correlation coefficients corresponding to the at least one local peak may be determined. In one embodiment, the spatial locations along with the correlation coefficients may be determined by the processor 110.

At step 412, a presence of the template image in the target image may be identified based upon an intersection of the spatial locations. In one embodiment, the presence of the template image in the target image may be identified by the processor 110.

The disclosed embodiments encompass numerous advantages. Various embodiments of a method for searching an image within another image may be disclosed. The method may include processing a template image by removing backgrounds near boundaries in order to get a maximum bounding box containing a structure of the template image. Further, the method may include producing a plurality of template edge images and a plurality of target edge images based on determination of edge gradients of the template image and a target image in one or more directions respectively. Further, images comprising correlation coefficient values may be produced for each of the one or more directions by computing correlation coefficients between the plurality of template edge images and the plurality of target edge images. Further, spatial locations along with the correlation coefficients corresponding to at least one local peak may be determined, where the at least one local peak may be identified from each of the images comprising the correlation coefficient values. Thereafter, based upon an intersection of the spatial locations, a presence of the template image in the target image may be identified.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for searching an image within another image, the method comprising:
   producing a plurality of template edge images, having one or more image scales, based on determination of edge gradients of a template image in one or more directions, wherein the template image indicates an image to be searched;
   producing a plurality of target edge images, having one or more image scales, based on determination of edge gradients of a target image in the one or more directions, wherein the target image indicates another image within which the image needs to be searched;
   producing images comprising correlation coefficient values for each of the one or more directions by computing correlation coefficients between the plurality of template edge images and the plurality of target edge images;
   identifying at least one local peak from each of the images comprising the correlation coefficient values;
   determining spatial locations along with the correlation coefficients corresponding to the at least one local peak; and
   identifying presence of the template image in the target image based upon an intersection of the spatial locations.

2. The method of claim 1, wherein the edge gradients are determined using gradient operators applied in the one or more directions.

3. The method of claim 1, wherein the template image comprises at least one of a logo and a text.

4. The method of claim 1, further comprising removing backgrounds and eliminating noise from the template image and the target image.

5. The method of claim 1, further comprising validating the presence of the template image in the target image based on at least one of statistical inference of the correlation coefficients exceeding a predefined threshold, and color match between the template image and the target image.

6. The method of claim 5, wherein the statistical inference corresponds to one of a maximum, mean, and a median of the correlation coefficients.

7. A system for searching an image within another image, the system comprising:
   a processor; and
   a memory, wherein the processor is configured to execute programmed instructions stored in the memory to:
      produce a plurality of template edge images, having one or more image scales, based on determination of edge gradients of a template image in one or more directions, wherein the template image indicates an image to be searched;
      produce a plurality of target edge images, having one or more image scales, based on determination of edge gradients of a target image in the one or more directions, wherein the target image indicates another image within which the image needs to be searched;
      produce images comprising correlation coefficient values for each of the one or more directions by computing correlation coefficients between the plurality of template edge images and the plurality of target edge images;
      identify at least one local peak from each of the images comprising the correlation coefficient values;
      determine spatial locations along with correlation coefficients corresponding to the at least one local peak; and
      identify presence of the template image in the target image based upon an intersection of the spatial locations.

8. The system of claim 7, wherein the edge gradients are determined using gradient operators applied in the one or more directions.

9. The system of claim 7, wherein the template image comprises at least one of a logo and a text.

10. The system of claim 7, further comprising removing backgrounds and eliminating noise from the template image and the target image.

11. The system of claim 7, wherein the presence of the template image in the target image is validated based on at least one of statistical inference of the correlation coefficients exceeding a predefined threshold, and color match between the template image and the target image.

12. The system of claim 11, wherein the statistical inference corresponds to one of a maximum, mean, and a median of the correlation coefficients.

13. A non-transient computer-readable medium comprising instructions for causing a programmable processor to search an image within another image by:
   producing a plurality of template edge images, having one or more image scales, based on determination of edge gradients of a template image in one or more directions, wherein the template image indicates an image to be searched;
   producing a plurality of target edge images, having one or more image scales, based on determination of edge gradients of a target image in the one or more directions, wherein the target image indicates another image within which the image needs to be searched;
   producing images comprising correlation coefficient values for each of the one or more directions by computing correlation coefficients between the plurality of template edge images and the plurality of target edge images;
   identifying at least one local peak from each of the images comprising the correlation coefficient values;
   determining spatial locations along with correlation coefficients corresponding to the at least one local peak; and
   identifying presence of the template image in the target image based upon an intersection of the spatial locations.

* * * * *